Sept. 25, 1934.     C. B. SHILLINGER ET AL     1,974,837
BOTTLE TRANSFERRING APPARATUS
Filed Feb. 2, 1933     6 Sheets-Sheet 1
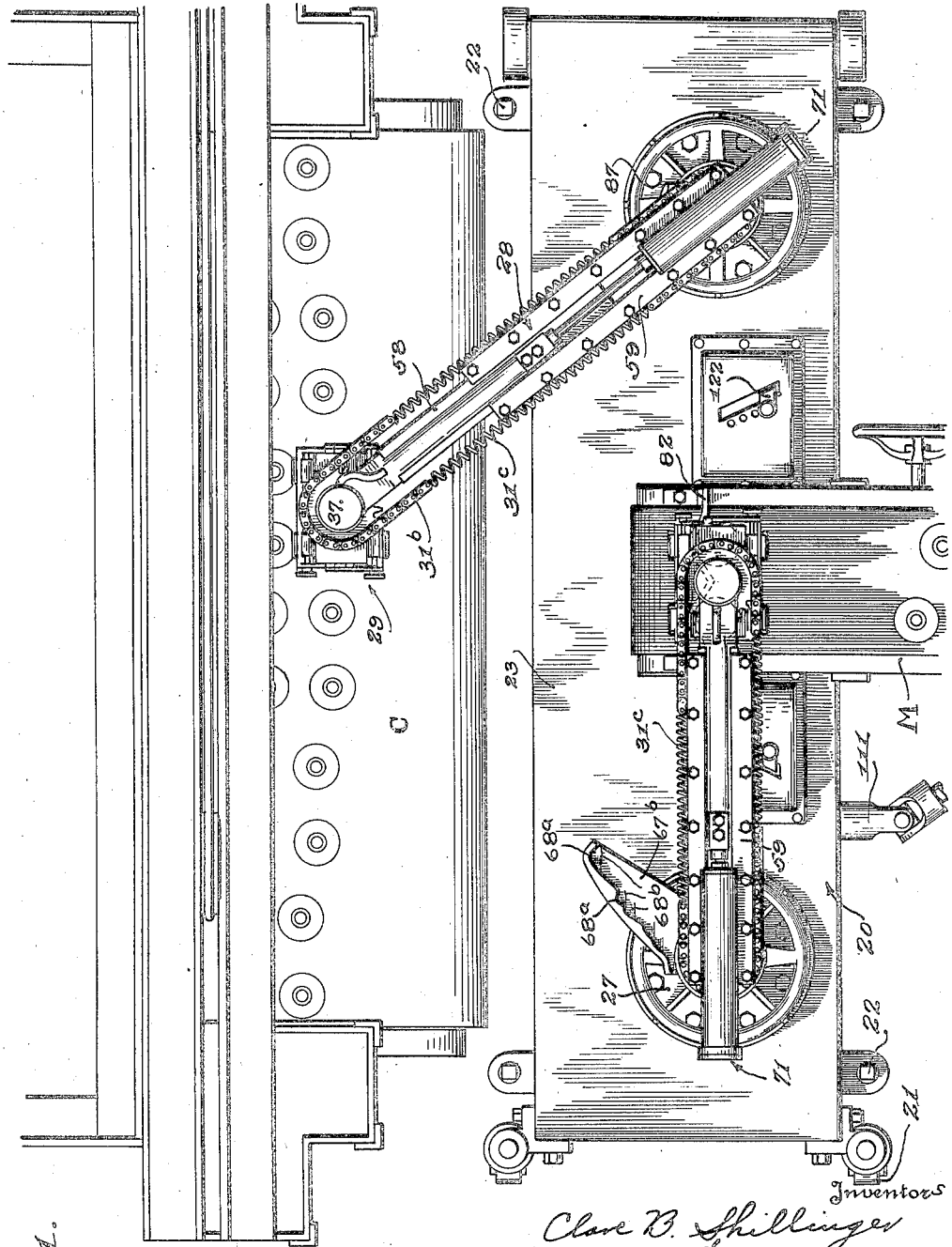

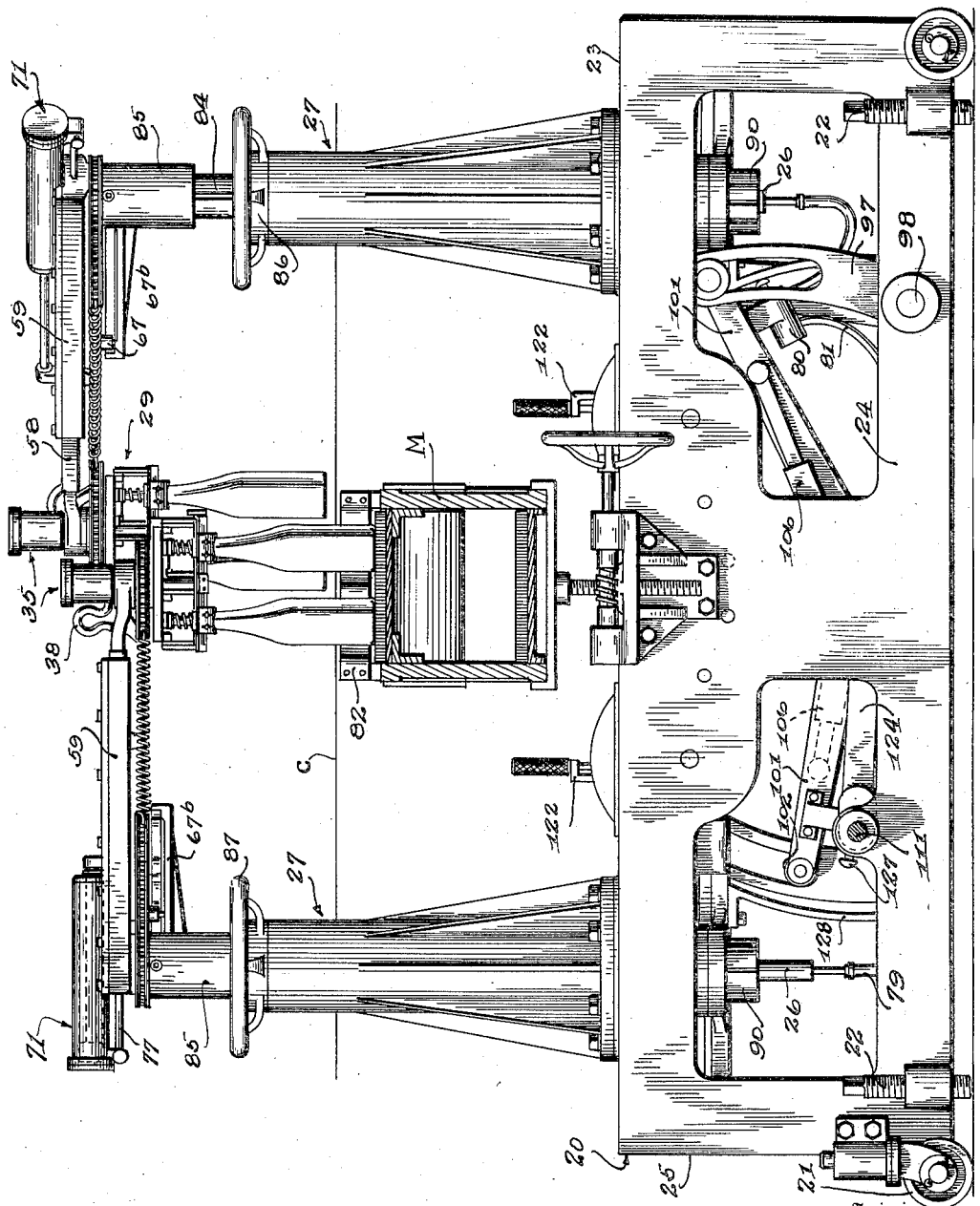

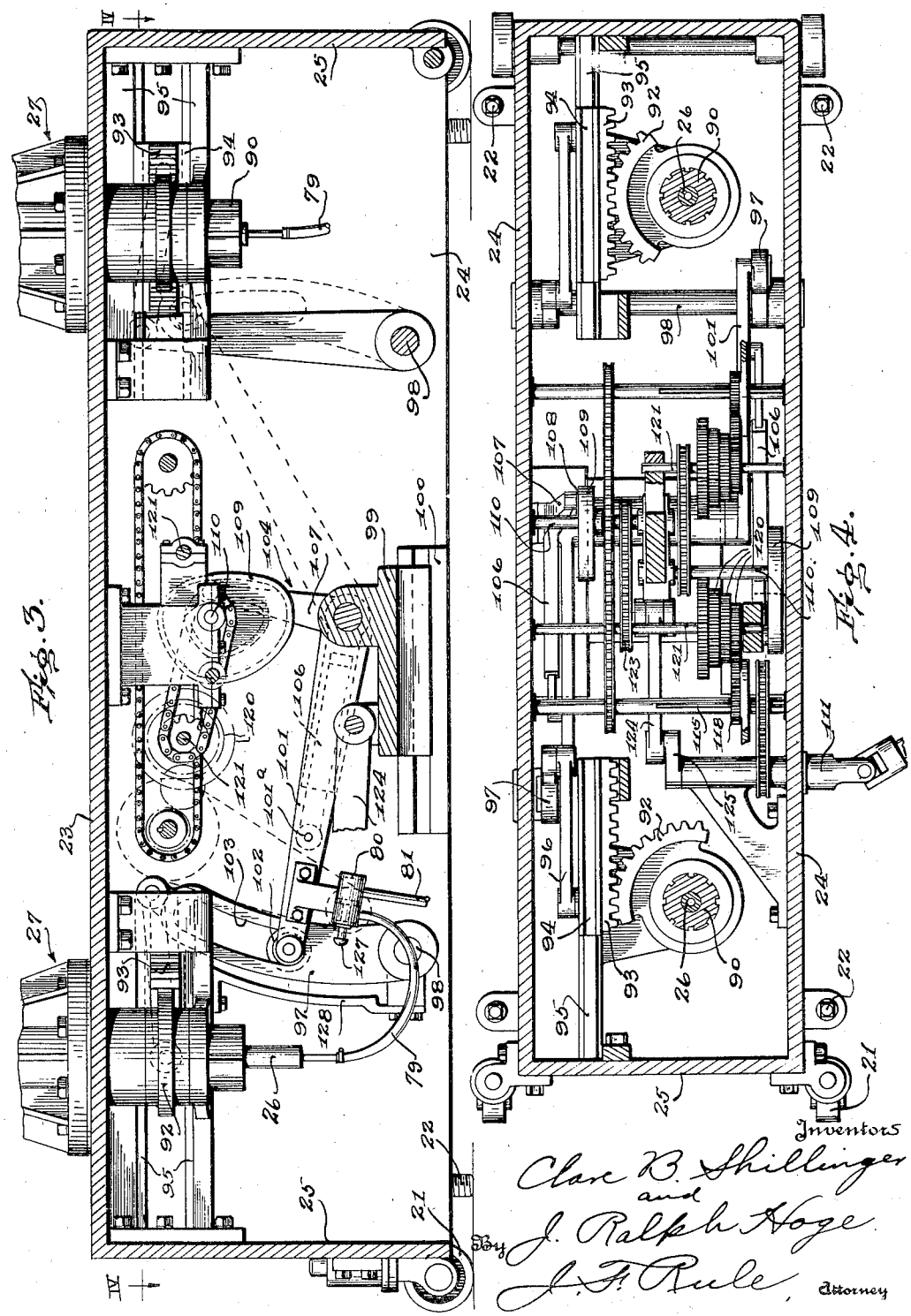

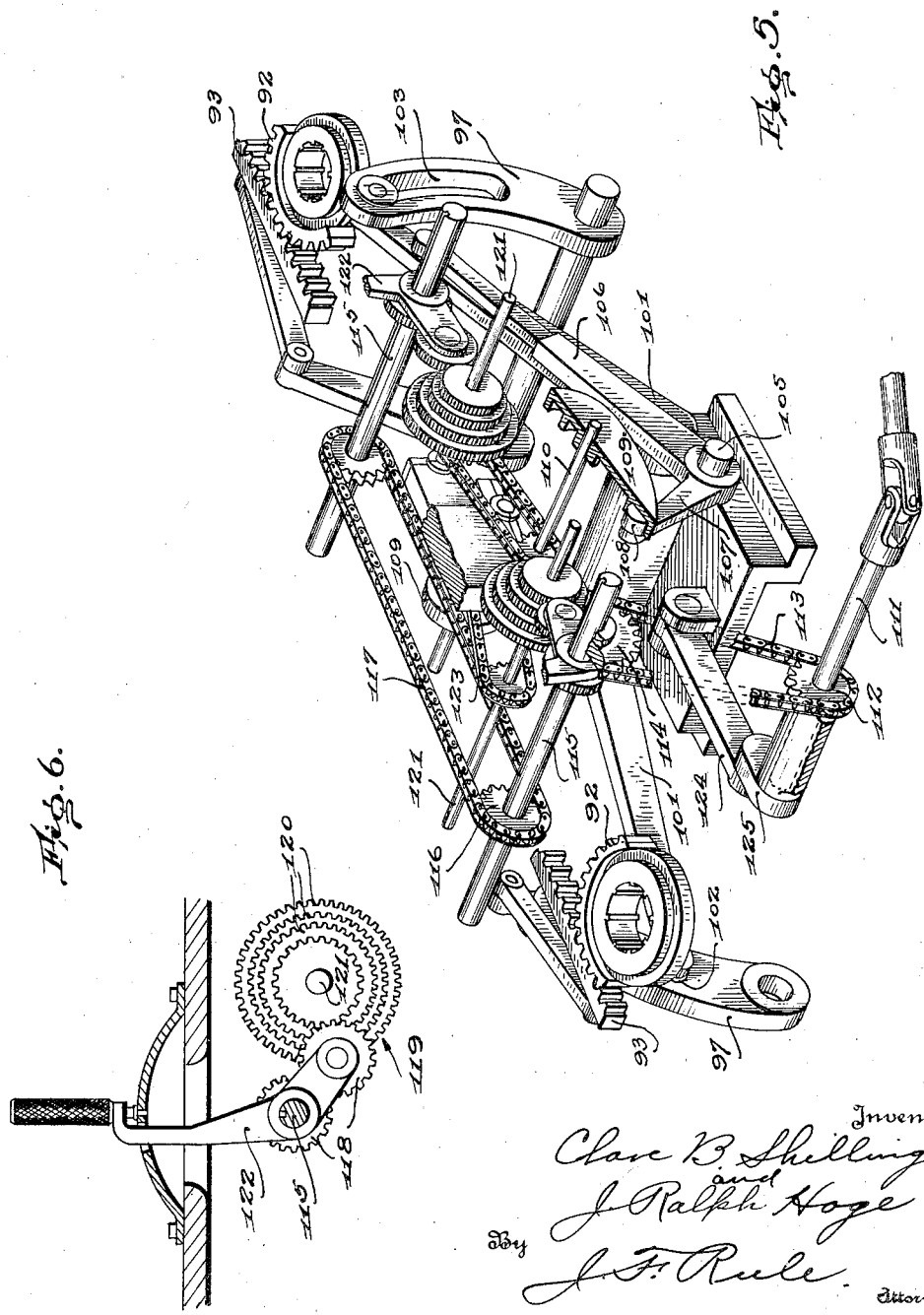

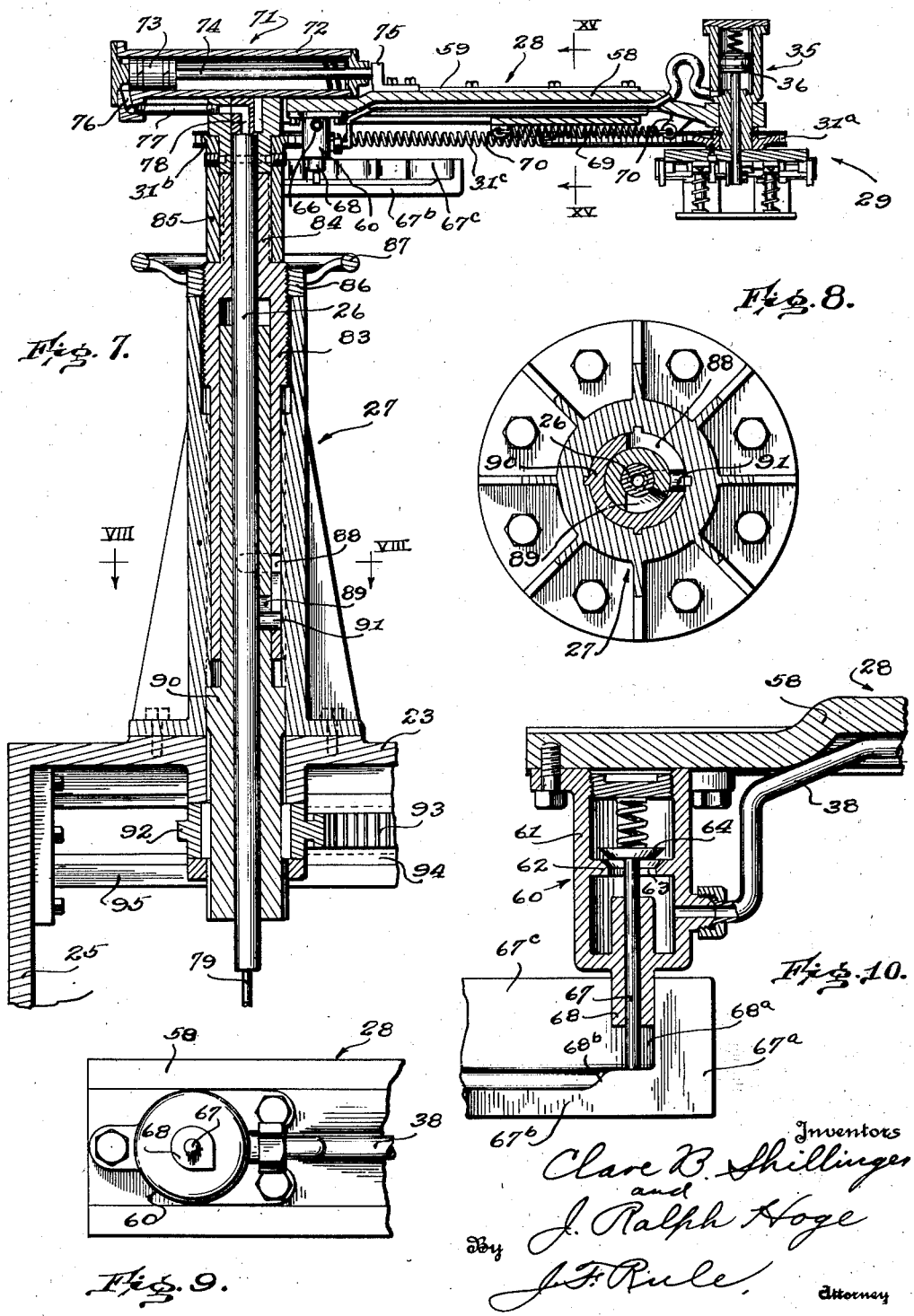

Sept. 25, 1934.  C. B. SHILLINGER ET AL  1,974,837
BOTTLE TRANSFERRING APPARATUS
Filed Feb. 2, 1933  6 Sheets-Sheet 6
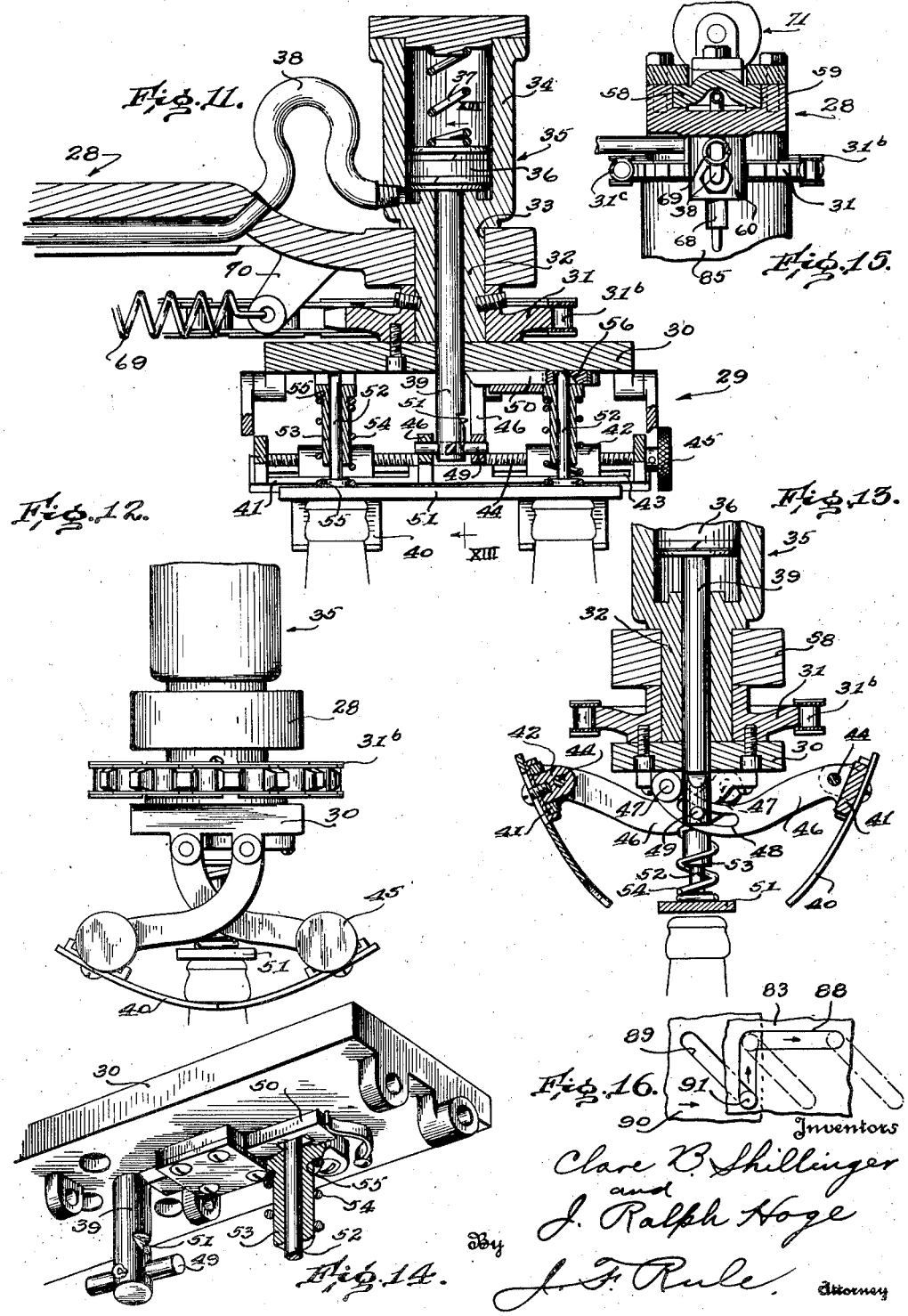

Patented Sept. 25, 1934

1,974,837

UNITED STATES PATENT OFFICE 1,974,837

BOTTLE TRANSFERRING APPARATUS

Clare B. Shillinger and John Ralph Hoge, Toledo, Ohio, assignors to Owens-Illinois Glass Company, a corporation of Ohio Application February 2, 1933, Serial No. 654,914

17 Claims. (Cl. 214—1)

The present invention relates to improvements in apparatus for transferring bottles and more particularly to that type of apparatus designed to place articles of glassware, such as bottles and jars, upright and in uniform spaced relation upon a leer conveyor.

An object of the present invention is the provision of a portable apparatus which may with comparative ease be moved about a glass factory for use with different leers. To this end the apparatus includes a wheeled base and means whereby it may be adjusted to compensate for variations in the elevation of the leer conveyors.

Another object is the provision of a bottle transferring apparatus capable of efficiently meeting the demands of the high speed production of the modern automatic bottle forming machine. To this end the apparatus may well include two cooperating transferring devices which remove bottles or like articles from a common loading point on a machine conveyor and deposit them uniformly spaced apart in different areas of a glassware annealing leer.

A further object is the provision of an apparatus of the above character in which bottle supporting tongs are mounted upon the outer end of a swinging arm, the length of which is changed automatically predetermined degrees with each successive transferring operation in order that the bottles or similar articles will be placed in different uniformly spaced positions on the leer conveyor.

A still further object is the provision in an apparatus of the above character, of means for adjusting it to compensate for variations in the type and size of articles being handled. To this end the apparatus is constructed to permit adjustment to compensate for differences in the height of the bottles or jars and the extent to which the tong carrying arms are automatically lengthened with each swinging movement of the arm, the latter feature determining the points at which the articles are deposited upon the leer conveyor and of necessity being regulable to compensate for differences in the diameter of the articles being handled.

Other objects will be in part apparent and in part pointed out hereinafter.

In the drawings:

Fig. 1 is a plan view of the bottle transferring apparatus positioned between the delivery end of a machine conveyor and the receiving end of a glassware annealing leer.

Fig. 2 is a front elevational view of the apparatus, the machine conveyor being shown in cross section.

Fig. 3 is a fragmentary vertical sectional view illustrating a part of the mechanism for actuating the tongs and supporting arms therefor.

Fig. 4 is a horizontal sectional view with parts in elevation taken substantially along the line IV—IV of Fig. 3.

Fig. 5 is a detail perspective view of the mechanism for operating the tongs and supporting arms.

Fig. 6 is a sectional elevational view of the timer or gear change mechanism.

Fig. 7 is a vertical sectional view through one of the transferring units.

Fig. 8 is a sectional plan view taken substantially along the line VIII—VIII of Fig. 7.

Fig. 9 is a fragmentary bottom plan view of the valve for controlling the supply of air under pressure to the tongs actuating motor.

Fig. 10 is a vertical sectional view of the valve shown in Fig. 9 and shows in elevation a device for opening the valve and limiting projection of the tongs.

Fig. 11 is a vertical sectional view of the tongs and operating mechanism.

Fig. 12 is an end elevational view thereof.

Fig. 13 is a fragmentary vertical sectional view taken substantially along the line XIII—XIII of Fig. 11.

Fig. 14 is a fragmentary perspective view of the tongs carrier or head.

Fig. 15 is a sectional view taken on the line XV—XV of Fig. 7.

Fig. 16 is a detail view illustrating two successive positions of pins and slots forming part of the tongs raising and swinging means.

In more or less general terms our bottle transferring apparatus consists of a bottle supporting device, such for example, as tongs, mounted for movement along a plurality of substantially horizontal paths all of which terminate at one end at a single loading or bottle pick-up station over one end of a machine conveyor and at their other end at a plurality of discharging stations over the receiving end of and spaced apart in a direction transverse to the length of a leer conveyor. Means for moving the tongs may well include arms supporting the tongs at one end and movable in a substantially horizontal plane, the arms having their length changed automatically with successive transferring operations so that the tongs follow different paths at regular time intervals and deliver bottles or the like to uniformly spaced stations on the leer conveyor. As will be apparent hereinafter, the angles through which the tongs supporting arms swing are variable in such a fashion that bottles or jars, irrespective of differences in diameter, may be spaced apart uniformly on the leer conveyor.

The illustrated embodiment of the apparatus consists of a portable base 20 which in addition to supporting the tongs and arms therefor, constitutes a housing or cover for operating mechanism as will be apparent. The base is supported on wheels 21 and provided with combined set and leveling screws 22, the functions of the latter being to at least in part support the entire apparatus in fixed relation to a leer and machine conveyor, level the base, and, if necessary, change within certain limits the elevation of said base and parts supported thereby. The base, which is of oblong configuration, includes a horizontal table 23 or top, and depending side and end walls 24 and 25 respectively. Transfer devices individual to the two longitudinal halves of the annealing leer are arranged side by side on the top 23 of said base.

Each transfer device consists of a vertical rock shaft 26 which is mounted for oscillation in a pedestal 27 rising from the table 23, said shaft having attached to its upper end a horizontal arm 28 upon the outer end of which the tongs unit 29 is supported. This unit (Figs. 1 and 2) when constructed for handling two or more bottles simultaneously is so connected to the arm that it may be oscillated independently of the latter about a vertical axis whereby pairs of bottles, for example, may be placed upon the leer conveyor C in the same positions relative to each other and to the intended direction of travel through the leer as those occupied on the machine conveyor M. The tongs are adjustable to compensate for variations in the diameter of the bottles or jars being transferred. The construction for accomplishing the above may well be substantially as follows. A tongs carrier plate 30 is connected through a sprocket 31 to a vertical sleeve 32 which is journaled in a vertical opening 33 formed in the outer end of the arm 28, said sleeve constituting a downward extension of the cylinder 34 of a vertical piston motor 35. A piston 36 in the cylinder is normally and yieldingly held at the lower end of the latter by a coil spring 37 and at regular time intervals is moved to the upper end cylinder by means of air under pressure supplied through a conduit 38. A piston rod 39 extends downwardly through the sleeve 32 and a vertical opening in the tongs carrier plate 30. Opposed pairs of notched fingers 40 are adjustably connected to a pair of opposed carrier bars 41 which are disposed parallel with the length of the tongs carrier plate 30. The fingers 40 are adjustably and separably connected to slide blocks 42 so that the spaced relation between the adjacent ends of the fingers may be varied as required by differences in the diameter of the bottles or jars being handled. The slide blocks themselves are fitted in slots 43 or slideways extending longitudinally of the carrier bars 41. Adjusting screws 44 individual to and extending lengthwise of the carrier bars 41 have threaded engagement with openings formed in said slide blocks. The opposite end portions of these adjusting screws are threaded in opposite directions so that rotation of the screws in one direction moves the pairs of tongs apart while the reverse rotation of said screws brings the pairs of tongs closer together. Knurled adjusting wheels 45 provide convenient means for rotating the screws 44. Substantially at the center of the tongs unit a pair of crossed levers 46 are pivoted to hinge pins 47 on the lower side of the carrier plate 30 and connected at their outer ends to the carrier bars 41. Slots 48 extending lengthwise of the inner end portions of the levers 46 and a cross pin 49 at the lower end of the piston rod 39 extending through said slots, provide operative connection between the motor and said tongs. A spring pressed detent 50 (Figs. 11, 14) slidingly mounted on the lower side of the carrier plate 30 and adapted for cooperation with a notch 51 in one side of the piston rod 39, functions to hold the tongs open in opposition to closing pressure of the coil spring 37.

The tongs are closed about the neck portions of bottles or the like, by downward movement of the piston rod 39 under pressure of the spring 37, such operation being effected by release of the piston rod from the holding influence of the spring pressed detent 50. Retraction of the detent to release the piston rod as just indicated is directly controlled by the bottles or other articles being handled. The construction involved includes a horizontal bar 51 centrally disposed between the side margins of and beneath the tongs carrier plate 30. Guide pins 52 extending vertically upward from the opposite ends of the bar 51 are fitted in guides 53 depending from the lower side of the plate 30. Coil springs 54 encircling the guides and pins have their end coils fitted in annular grooves 55 in said guides 53 and bosses on the upper side of the bar 51 to hold the parts assembled. The upper end of one of the pins 52 at times projects into a vertical opening in the detent 50, one wall 56 thereof being tapered. Engagement between said wall and pin together with a certain degree of upward movement of the pin due to relative vertical movement between the tongs unit and bottles, with the latter engaging the bar 51, retracts the detent and permits the piston rod 39 to move downward under pressure of the spring 37 and thereby bring the tongs into supporting engagement with the bottles or the like.

Successive operations of the tongs as will be apparent hereinafter, involve changes in the spaced relation between the tongs unit 29 and the shaft 26 about which the tongs are oscillated in order that bottles may be deposited upon the leer conveyor in a manner having some semblance of transverse rows across the conveyor. This will become more evident in the description of the operation to follow.

The construction involved in accomplishing the above may be substantially as follows. The arm 28 is made up of a pair of telescoping sections one of which is in the form of a slide bar 58 while the other takes the form of a slideway 59. The slide bar 58 has its outer end formed with a vertical opening through which the extension 32 on the cylinder 34 of the tongs operating motor 35 extends and in which the entire tongs unit is free to oscillate as and for the purposes set forth hereinafter. At the inner end of the slide bar 58 a valve 60 is provided to control the flow of air under pressure through the conduit 44 to the tongs operating motor 35. This valve is attached to the lower side of the slide bar 58 and includes a vertical cylinder 61 divided into two compartments by a wall 62 which has a vertical port 63 therein normally closed by a valve disk 64 under pressure of the spring 65. The upper compartment is connected to a pipe 66 leading to any suitable source of supply of air under pressure while the lower compartment is directly connected to the conduit 44 through the pipe 38 referred to heretofore. A valve stem 67 depending from the valve disk 64 projects a short distance below the lower end of the valve housing and a guide 68, said guide also constituting part of means for limiting outward movement of the slide bar 58 in the slideway 59. Opening of the valve due to upward movement of the stem 67 results in flow of air under pressure to and through the conduit 38 to the lower end of the tongs actuating motor 35. Immediately the detent 50 engages the piston rod and holds the tongs open.

Normally the arm 28 is yieldingly held contracted by means of a coil spring 69, the ends of which are secured to apertured ears 70 on the lower side of the slide bar and slideway. Extension of the arm is effected by a horizontal piston motor 71 (Fig. 7) which is mounted upon the upper end of the pedestal and includes a horizontal cylinder 72 and a piston 73 therein, said piston having a rod 74 thereon extending through one end of the cylinder and at all times engaging an upstanding boss 75 at the inner end of the slide bar 58. Air under pressure is supplied to one end of the motor 71 by way of an inlet port 76 and a pipe 77, the latter communicating with a conduit 78 extending lengthwise through the rock shaft 26. A flexible supply pipe 79 (Figs. 3, 7) connects the lower end of the conduit 78 with a valve 80 which in turn is connected to any suitable source of supply of air under pressure by way of a pipe 81. The construction and operation of the valve will be set forth presently.

Both the degree of extension of the arm 28 and point at which the tongs are opened to release articles at the discharging stations over the leer conveyor C, are controlled by a stop 67$^a$ (Figs. 1, 10) and cams 68$^b$ associated therewith, said stop being stationary and disposed at the upper end of the corresponding pedestal 27. The stop includes a floor 67$^b$ and up upstanding wall 67$^c$ extending along one margin thereof, said wall provided with vertical notches or grooves 68$^a$ on its inner surface adapted for engagement with the guides 68 depending from the valve 60. In advance of each notch 68$^a$ and formed on the upper side of the floor 67$^b$ is a cam 68$^b$ over which the lower end of the valve stem 67 slides substantially at the end of the transferring movement of the arm 28. Extension of the arm by which the guide 68 is brought into engagement with one of the notches 68$^a$ and the valve stems 67 moved over the cam surface 68$^b$, is obtained by operation of the motor 71. This is entirely obvious.

Oscillation of the tongs unit about its own vertical axis is obtained by training a sprocket chain 31$^a$ over the sprocket 31 just above the tongs carrier plate 30 and a sprocket 31$^b$ which is stationary and suitably attached to the upper end of the collar 85 on the pedestal. Coil springs 31$^c$ permit varying degrees of extension of the arm 28 without interfering with operative connection between the sprockets 31$^d$ and 31$^b$. Through the above connection between the tongs unit and sprocket on the corresponding pedestal, swinging of the arm 28 effects such a degree of rotation of the tongs unit about its vertical axis that the longitudinal axis of the tongs unit is at all times parallel with respect to the position normally occupied at the loading station. Thus the articles are arranged in orderly fashion upon the leer conveyor.

As brought out heretofore, the arm 28 is adapted to oscillate through angles and along paths which vary with successive operations in order that bottles or like articles may be spaced apart upon the leer conveyor C. Also in advance of initial horizontal movement of the arm in the direction of the leer conveyor, the arm is lifted vertically bringing the bottoms of the bottles or jars to an elevation at which the bumper plate 82 will be cleared when such horizontal movement of the arm is started. As a result of moving the arm upwardly said bottles will be spaced only a short distance above the leer conveyor at the time they reach the discharging stations. The specific construction illustrated is substantially as follows. The rock shaft 26 extends upwardly through two telescoping sleeves which are arranged in the pedestal 27. The outer sleeve 83 which is splined to the pedestal and, therefore, held against rotation, has a diametrically reduced upper end 84 upon which a collar 85 is fixed, said collar in turn carrying the sprocket 31$^b$ referred to above. An adjusting collar 86 carrying a hand wheel 87 is threaded upon an intermediate portion of the outer sleeve 83, said collar resting upon the upper end of the pedestal 27 and adapted for adjustment to change the elevation of said sleeve and, therefore, the arm and tongs unit, as may be required by the specific form of the articles being handled. A substantially inverted L-shaped slot 88 (Figs. 7, 16) is formed in the stationary outer sleeve in proximity to its lower end and at all times has a portion thereof in alignment with an inclined slot 89 formed in an intermediate portion of the inner sleeve 90. A radial pin 91 on the rock shaft 26 extends through the two slots 88 and 89. The relative position of these slots is such that a predetermined degree of rotation of the inner sleeve 90 at the beginning of each transferring operation raises the pin 91 to the level of the horizontal portion of the inverted L-shaped slot 88 and, therefore, correspondingly lifts the rock shaft and parts supported thereon. Continued rotation of the inner sleeve moves the pin 91 a predetermined distance about the axis of the shaft in the slot 88, such distance representing the angle through which the arm 28 moves and being determined by mechanism which will be described presently.

As stated heretofore, the two tongs units are placed in alternation at the loading and discharging stations, such movement of the units being effected by mechanisms individual thereto, both of which mechanisms are directly controlled by a single continuously rotating shaft. Each mechanism consists of a sector gear 92 keyed to the lower end of the inner sleeve 90 and a rack bar 93 meshing with said gear. The rack bar is carried by a slide 94 mounted in horizontal slideways 95 and connected through a link 96 to the upper end of a rock arm 97, the latter pivoted at its lower end to a horizontal hinge pin 98. Rocking of the arm 97 is obtained by means of a reciprocating slide block 99 mounted in horizontal slideways 100 and connected through an arm 101 to said rock arm. A roller 102 at the outer end of the arm 101 is disposed in a longitudinal slot 103 in the upper part of the rock arm 97 provides operating connection between said arms. The location of the roller 102 in the slot 103 at the beginning of each transferring movement of the tongs unit 29 determines the extent to which the rock arm 97 will be moved and, therefore, the degree of movement of the rack bar 93. Thus, the length of the path of the said tongs unit is determined. Mechanism for automatically changing the point of connection between the rock arm 97 and arm 101 predetermined degrees and in an orderly fashion, may be substantially as follows. A bell crank lever 104 journaled upon a horizontal hinge pin 105 includes a telescopic arm 106 extending alongside of the arm 101 and connected at its outer end to the pin 101$^a$ carried by the latter. The other arm 107 of the bell crank lever extends upwardly and carries a cam roll 108 running in a continuous cam 109 which may be continuously or intermittently rotated about a horizontal shaft 110 upon which it is supported. This cam in the present instance rotates continuously and is of such configuration that it moves the bell crank lever 104 and, therefore, the arm 101 in a step-by-step fashion to place the roller 102 in three different positions in the slot 103 and holds it in each of the several positions during a complete oscillation of the tongs unit. Shifting of the roller 102 from one point to another and holding it against movement at each point for a predetermined period of time, is obtained by shaping the cam 109 so that only circumferentially spaced areas of the cam are concentric to the axis of rotation of the cams, said areas being of such length and the cam rotating at such a speed that the bell crank lever is held against movement a predetermined period of time. These areas correspond in number to that of the discharging stations over the leer conveyor.

The cam is rotated by mechanism including a continuously rotating shaft 111 carrying a sprocket 112 over which a sprocket chain 113 is trained, said chain also being trained over a sprocket 114 on a horizontal shaft 115 disposed in the upper part of the base 20. This shaft 115 at one end carries a sprocket 116 which operates through a sprocket chain 117 to drive the mechanism for actuating the other tongs unit. Gears 118 forming part of a speed change device 119 including a plurality of different size gears 120 mounted upon a horizontal shaft 121, are carried by a shifter lever 122. One of the gears 118 is keyed to said shaft 115 so that rotation of the latter imparts rotary movement to both of said gears 118 and through them and one of the gears 120, rotates the shaft 121. A sprocket chain 123 is trained over sprockets on the shafts 121 and 110. Thus it will be seen that rotation of the shaft 111 operates through the sprockets, chains, and speed change device 119 to rotate said cam 109. The speed at which the cam rotates is determined by the setting of the lever 122 as is obvious and the position of this lever is governed entirely by the number of discharge stations over the leer conveyor. If for example there are three, driving will be effected through the smallest of the gears 120; if four stations, then the next size gear is brought into operation, and so on. It may be necessary to change cams although one cam may have a sufficient number of concentric areas thereon to accommodate the maximum number of stations ever involved.

Reciprocation of the slide block 99 is obtained by connecting it through a crank 124 and crank arm 125 to the inner end of the main drive shaft 112. Continuous rotation of this shaft reciprocates the slide block in timed relation to rotation of the cam 109 and other operations.

Control of the projection or extension of each arm 28 during successive transferring operations is obtained by a construction substantially as follows. The valve 80 referred to heretofore, is connected through a bracket 126 to the arm 101. A forwardly projecting valve stem 127 engages an actuator bar 128 just before the arm 101 reaches its limit of outward movement. The actuator bar 128 which is fixed against movement and extends substantially alongside of the corresponding rock arm 97, opens the valve 80 so that air under pressure is allowed to flow to the motor 71 at the upper end of the corresponding pedestal 27. Immediately the motor 71 operates to project the slide bar 58 a distance which is determined by the stop 67$^a$.

The operation may be stated as follows. Assuming that bottles are being placed two at a time at the loading station on the machine conveyor M, and that the shaft 111 is rotating continuously, it is apparent that the slide block 99 will be reciprocated at a constant speed and thereby alternately oscillate the rock arms 97. These arms being connected through the rack and gear mechanisms to the rock shafts 26 oscillate the latter and thereby correspondingly move the tongs unit 29. Because of the above construction and pin and slot connection between the sleeves 83 and 90 in the pedestals, the tongs units will be alternately raised and lowered as well as moved horizontally in the fashion brought out above. Lowering of the tongs units at the loading station effects engagement between the actuator bar 51 and the upper ends of the pairs of bottles and with continued downward movement of the unit, the spring pressed detent 50 is operated to allow the motor 35 to bring the tongs together into supporting engagement with the bottles. Operation of the rack and gear mechanism initially lifts the tongs unit and bottles supported thereby vertically a sufficient distance to bring the bottoms of the bottles to a point above the stop plate 82 as well as to a horizontal plane a very short distance above the upper surface of the leer conveyor C. Swinging of the arm 28 toward the discharging station follows immediately. Slightly in advance of reaching the end of its swinging movement the arm is extended by operation of the piston motor 71. Extension of the arm 28 involving outward movement of the slide bar 58 or section, brings the guide 68 or boss, into engagement with one of the recesses 68$^a$ in the stop plate 67$^a$ and in addition causes opening of the valve 64 so that air under pressure is supplied to the motor 35 which opens the tongs to release the bottles at one of the discharging stations. Although the valve 64 is opened prior to the tongs unit coming to a dead stop, the time interval is so slight that the tongs actuating motor 35 will not in fact operate until the tongs have reached the discharging station and come to a standstill.

Modifications may be resorted to within the spirit and scope of the appended claims.

What we claim is:

1. In combination, a horizontal machine conveyor, a horizontal leer conveyor having its receiving end disposed in proximity to one end of the machine conveyor, means for transferring articles from said one end of the machine conveyor to the leer conveyor and placing them upright on the latter, including article supporting tongs mounted for movement about a vertical axis, and means whereby the tongs are caused to follow paths of different curvature and length during successive article transferring operations to thereby place articles side by side on the leer conveyor.

2. In combination, a horizontal machine conveyor, a horizontal leer conveyor having its receiving end disposed in proximity to one end of the machine conveyor, means for transferring articles from the machine conveyor to the leer conveyor and placing them upright on the latter including article supporting tongs, a supporting arm for the tongs mounted for oscillation about a vertical axis, means for oscillating the arm to thereby alternately place the tongs over one end of the machine conveyor, and automatic means for changing the spaced relation between the tongs and the axis about which the arm swings with each successive oscillation of the arm to thereby change at regular time intervals the point at which articles are placed upon the leer conveyor.

3. In combination, a horizontal machine conveyor, a horizontal leer conveyor having its receiving end disposed in proximity to one end of the machine conveyor, means for transferring articles from the machine conveyor to the leer conveyor and placing them upright on the latter including tongs, a two section telescopic arm carrying said tongs and mounted for oscillative movement about a vertical axis, means for oscillating the arm and thereby placing the tongs over the conveyors in alternation, means for changing the length of the arm with each successive movement toward the leer conveyor to thereby place the tongs in different positions over the latter with each succeeding operation, and means for actuating the tongs.

4. In combination, a horizontal machine conveyor, a horizontal leer conveyor having its receiving end disposed in proximity to one end of the machine conveyor, means for transferring articles from the machine conveyor to the leer conveyor and placing them upright on the latter including tongs, a two section telescopic arm carrying said tongs and mounted for oscillative movement about a vertical axis, means for oscillating the arms and thereby placing the tongs over the conveyors in alternation, means for changing the length of the arm with each successive movement thereof toward the leer conveyor to thereby place the tongs in different positions over the latter with each succeeding operation, means for actuating the tongs, and means for oscillating the tongs in a horizontal plane relative to the arm at regular time intervals.

5. A leer loader comprising a pair of horizontally disposed arms mounted for oscillation about horizontally spaced vertical axes, bottle supporting tongs at the outer ends of said arms, means for moving the arms in alternation and thereby placing the tongs one at a time at a single loading station between the axes of rotation of the arms and discharging stations individual to the tongs, automatic means causing the tongs to move along different paths to the discharging stations with successive oscillations of the arms, and means for actuating the tongs causing them to alternately grip and release bottles.

6. A leer loader comprising a pair of horizontally disposed arms mounted for oscillation about horizontally spaced vertical axes, bottle transferring tongs on the outer ends of said arms, means for moving the arms in alternation thereby placing the tongs one at a time at a single loading station between the axes of rotation of the arms and discharging stations individual to the tongs, automatic means for changing the length of said arms with each successive oscillation thereof to thereby vary the direction of movement of the tongs away from the loading station, and means for actuating the tongs in timed relation to oscillation thereof whereby they alternately grip and release bottles.

7. A leer loader comprising a pair of horizontally disposed arms mounted for oscillation about horizontally spaced vertical axes, bottle supporting tongs on the outer ends of said arms, means for moving the arms in alternation thereby placing the tongs one at a time at a single loading station between the axes of rotation of the arms and discharging stations individual to the tongs, automatic means for causing the tongs to move along different paths with successive oscillations of the arms, means for actuating the tongs whereby they alternately grip and release bottles, and means for oscillating the tongs about a vertical axis relative to their supporting arms during movement of the latter.

8. A bottle transferring apparatus comprising a horizontal arm mounted for oscillation about a vertical axis, bottle supporting tongs at the outer ends of the arm, means for imparting oscillatory movement to the arm to thereby alternately place the tongs at loading and discharging stations, said arm including two telescoping sections, a spring device yieldingly holding the arm contracted, an air motor for moving the sections to increase the length of the arm, and means for regulably controlling the effectiveness of said motor to thereby regulate the spaced relation between the tongs and the axis of rotation of the arm.

9. A bottle transferring apparatus comprising tongs, a horizontal arm supporting the tongs at one end and mounted for oscillatory movement about a vertical axis, means for moving the arm to thereby alternately place the tongs at a single loading station and one of a series of discharging stations, rack and pinion mechanism connected to the arm for oscillating it, a series of levers and slides for actuating the rack, and a cam operatively connected to one of the levers and operating automatically to predetermine the angle through which the arm moves during successive oscillations to thereby correspondingly change the point of discharge of bottles in a regular order.

10. A bottle transferring apparatus comprising tongs, a horizontal arm supporting the tongs at one end and mounted for oscillatory movement about a vertical axis, means for moving the arm to thereby alternately place the tongs at a single loading station and one of a series of discharging stations, rack and pinion mechanism connected to the arm for oscillating it, a series of levers and slides for actuating the rack, a cam operatively connected to one of the levers and operating automatically to predetermine the angle through which the arm moves during successive oscillations to thereby correspondingly change the point of discharge of bottles in a regular order, and means for rotating the cam in timed relation with oscillation of the tongs supporting arm.

11. A bottle transferring apparatus comprising a base, a pair of pedestals rising from the upper side of the base and spaced apart horizontally, a rock shaft journaled in each pedestal, a horizontal arm secured to the upper end of each shaft, a tongs unit at the outer end of each arm, rack and pinion mechanism for rocking each shaft and thereby oscillating the arm and tongs, a series of levers connected to the rack bars, a slide common to both series of levers and adapted to operate them at regular time intervals to oscillate said arms in alternation, and means for moving the slide.

12. A bottle transferring apparatus comprising a base, a pair of pedestals rising from the upper side of the base and spaced apart horizontally, a rock shaft journaled in each pedestal, a horizontal arm secured to the upper end of each shaft, a tongs unit at the outer end of each arm, rack and pinion mechanism for rocking each shaft and thereby oscillating the arm and tongs, a series of levers connected to the rack bars, a slide common to both series of levers and adapted to operate them at regular time intervals to oscillate said arms in alternation, means for moving the slide, and a cam operating automatically to adjust the position of one of each series of levers at regular time intervals to thereby change the angle through which the arms are oscillated during successive cycles of operation.

13. A bottle transferring apparatus comprising a base, a pair of pedestals rising from the upper side of the base and spaced apart horizontally, a rock shaft journaled in each pedestal, a horizontal arm secured to the upper end of each shaft, a tongs unit at the outer end of each arm, rack and pinion mechanism for rocking each shaft and thereby oscillating the arm and tongs, a series of levers connected to the rack bars, a slide common to both series of levers and adapted to operate them at regular time intervals to oscillate said arms in alternation, means for moving the slide, a cam operating automatically to adjust the position of one of each series of levers at regular time intervals to thereby change the angle through which the arms are oscillated during successive cycles of operation, and means for rotating said cam in timed relation with oscillation of the arms.

14. A bottle transferring apparatus comprising a pair of horizontal arms mounted for oscillation about separate vertical axes, tongs supported at the outer ends of the arms, means for oscillating the arms whereby the tongs are brought one at a time to a single loading station and one of a series of discharging stations, said means including rack and pinion mechanisms individual to the arms, a slide, means for reciprocating the slide, and means including bell crank levers providing operating connection between the slide and both rack and pinion mechanisms.

15. A bottle transferring apparatus comprising a pair of horizontal arms mounted for oscillation about separate vertical axes, tongs supported at the outer ends of the arms, means for oscillating the arms whereby the tongs are brought one at a time to a single loading station and one of a series of discharging stations, said means including rack and pinion mechanism individual to the arms, a slide, means for reciprocating the slide, means including bell crank levers providing operating connection between the slide and both rack and pinion mechanisms, and cams individual to the rack and pinion mechanisms operable to regulably control and in a predetermined order vary the angle through which the arms are oscillated.

16. A bottle transferring apparatus comprising a tongs unit adapted to support bottles, means for actuating the tongs to thereby alternately grip and release bottles, a vertical rock shaft, a horizontal arm at the upper end of the shaft supporting said tongs unit, rack and pinion mechanism for rocking the shaft and thereby alternately placing the tongs at loading and discharging stations, means for reciprocating the rack including a rock arm, a slide block, a connector bar providing connection between the slide block and rock arm, automatic means operating at regular time intervals to change the point of connection between said connector bar and the rock arm and thereby correspondingly change the stroke of the rack and, therefore, the angle through which the tongs are moved, and means operating automatically to change the length of the tongs supporting arm with successive oscillations thereof.

17. A bottle transferring apparatus comprising a tongs unit adapted to support bottles, means for actuating the tongs to thereby alternately grip and release bottles, a vertical rock shaft, a horizontal arm at the upper end of the shaft supporting said tongs unit, rack and pinion mechanism for rocking the shaft and thereby alternately placing the tongs at loading and discharging stations, means for reciprocating the rack including a rock arm, a slide block, a connector bar providing connection between the slide block and rock arm, automatic means operating at regular time intervals to change the point of connection between said connector bar and the rock arm and thereby correspondingly change the stroke of the rack and, therefore, the angle through which the tongs are moved, said tongs unit supporting arm including telescopic sections, a piston motor for moving the sections to increase the length of the arm, automatic means for actuating the motor during successive transferring operations of the arm, and means whereby the degree of extension of the arm is varied with successive transferring operations.

CLARE B. SHILLINGER.
JOHN RALPH HOGE.